United States Patent
Bell

(10) Patent No.: US 7,531,221 B2
(45) Date of Patent: May 12, 2009

(54) FINISH PROTECTOR

(75) Inventor: Otis Franklin Bell, San Juan Capistrano, CA (US)

(73) Assignee: BAF Industries, Tustin, CA (US)

( * ) Notice: Subject to any disclaimer, the term of this patent is extended or adjusted under 35 U.S.C. 154(b) by 437 days.

(21) Appl. No.: 11/350,433

(22) Filed: Feb. 9, 2006

(65) Prior Publication Data

US 2007/0184200 A1    Aug. 9, 2007

(51) Int. Cl.
*B05D 7/00* (2006.01)
*B05D 1/32* (2006.01)
*C09D 5/02* (2006.01)
*C08L 31/02* (2006.01)

(52) U.S. Cl. .................... 427/407.1; 427/154; 524/556; 524/832; 525/303.3; 525/370; 525/386

(58) Field of Classification Search ................ 524/556, 524/832; 427/154, 407.1; 525/303.3, 370, 525/386
See application file for complete search history.

(56) References Cited

U.S. PATENT DOCUMENTS

| 5,041,488 A | | 8/1991 | Meades |
| 5,098,745 A | | 3/1992 | Gordon |
| 5,211,881 A | * | 5/1993 | Muller et al. .......... 252/389.52 |
| 6,773,746 B1 | * | 8/2004 | Bell ........................... 427/154 |

* cited by examiner

*Primary Examiner*—Randy Gulakowski
*Assistant Examiner*—Michael M Bernshteyn
(74) *Attorney, Agent, or Firm*—Walter A. Hackler

(57) ABSTRACT

The present invention provides a method of protecting a surface of an automobile body covered by an automobile finish which comprises applying a continuous coating of an automobile protectant finish composition to the surface, which composition comprises, before drying, an aqueous solution or emulsion comprising a film-forming, an or methacrylic acid co-polymer; and removing excess water from said coating to form a continuous coating of said copolymer on said surface.

4 Claims, No Drawings

FINISH PROTECTOR

BACKGROUND OF THE INVENTION

1. Field of the Invention

The invention relates generally to an automobile finish coating and more specifically to a acrylic automobile finish protectant which provides a high-gloss, substantive, protective layer on exterior painted metal surfaces.

2. Related Art

High-gloss, protective coatings for automobile finishes have traditionally involved the application of a wax to the exterior surface followed by buffing the applied wax. A wide variety of suitable hydrocarbon or vegetable-based waxes formulated with various additives are commercially available.

Nearly all waxes, however, are difficult to apply uniformly and require extensive buffing to provide a high gloss or shine.

Other available automobile finish products restore or improve automobile finishes which have experienced some deterioration due to wear and oxidative breakdown. Conventional products used for this purpose typically incorporate abrasive materials or tracers in the finish formulation. These materials typically remove or abrade some of the worn or oxidized finish to regenerate the shiny appearance of a newly painted surface.

Modern automotive painting techniques, however, are not compatible with abrasive products. In modern finishes, a relatively thin pigmented or color layer is applied underneath a relatively thick clear layer. This clear coating process is particularly vulnerable to abrasive formulations because once the coating layer is damaged or worn away, there is only a very thin layer of pigmented finish remaining on the surface. Further, should the clear coating wear away unevenly, entire sections of the automobile must be completely refinished to provide a uniform finish.

There exists a need for a nonabrasive, readily applicable automobile finish product which provides a high-gloss, protective coating without the need for extensive buffing and polishing. In addition, the protective coating should be nontoxic and environmentally inert. Further, the protective coating should be easy to apply, should be uniformly distributed or self-leveling over the finished surface, and should be relatively long lasting.

In U.S. Pat. No. 5,098,745 a silicone-based automobile finish is disclosed. This finish is applied by spraying an emulsion onto the surface of an automobile, wiping such sprayed surface to distribute the emulsion thereon and depositing the silicone by absorbing and removing the water from the emulsion with an absorbent cloth.

Obviously, it would be desirable to provide a protective finish to an automobile by merely spraying the automobile surface and allowing the surface to dry rather than distributing the protectant by wiping and removing excess water with an absorbent cloth.

SUMMARY OF THE INVENTION

The invention relates to a method of protecting an automobile finish which comprises the steps of applying an automobile finish protectant composition to an exterior surface of an automobile in an amount sufficient to form a continuous coating of an acrylic copolymer on said exterior surface upon drying and allowing said composition to dry.

Said automobile finish protectant composition is an aqueous dispersion or emulsion of an acrylic copolymer. The coating provided by the method of this invention is resistant to weathering an may easily be removed by rinsing with an aqueous alkaline solution, e.g. aqueous ammonia. In one embodiment of the present invention, the aqueous dispersion or emulsion may include a zirconium crosslinking agent, e.g. ammonium zirconium carbonate.

DETAILED DESCRIPTION

The copolymers utilized in the method of this invention may be acrylic or methacrylic acid-containing copolymers. The acrylic or methacrylic acid-containing copolymer will form a cohesive film at room temperature, i.e. it will have a Tg of less than about 25° C. or the copolymer is formulated with a plasticizer that enables the copolymer to form a film at about room temperature. Finally, to facilitate removal of the protectant coating it is preferred that the acrylic or methacrylic acid-containing copolymer will contain sufficient acrylic or methacrylic acid to be solubilized by alkali in an aqueous solution. To achieve these objectives, an acrylic acid or methacrylic acid monomer may be copolymerized with other acrylate monomers, e.g. ethylacrylate, butylacrylate, octylacrylate and the like. An example of suitable copolymer includes a copolymer of methacrylic acid and ethylacrylate.

The quantity and type of the acrylic or methacrylic acid copolymer in the coating composition may be optimized for a particular application. This is accomplished empirically. Generally where it is desired that the composition dry to provide a thicker final coating more solids are added to the composition. However, the upper limits to the acrylic or methacrylic acid copolymer concentration are dictated by the resulting viscosity of the composition. The viscosity of the wet coating must be low enough to permit application to and continuous coating of the surface. Thus, in order to produce a thick coating one increases the solids concentration, but not beyond a point where the composition becomes difficult or impossible to apply. Conversely, where a thin coating is desired, the solids composition may be decreased, but not to a point where the composition fails to form a continuous protective coating when dried.

To some extent, the optimal solids content of the mixture is a function of the application method. It is expected that the composition may be applied by a variety of methods known to those of skill in the art. These methods include, but are not limited to painting, spraying, reverse roller coating, etc. One of skill in the art will appreciate that application by the preferred method of spraying will generally require a composition of lower viscosity than application by painting.

The coatings of the present invention may additionally contain a surfactant. For example, the masking composition may include nonionic alkyl aryl surfactants such as Triton CF-10 and CF-12 (Rohm & Haas, Philadelphia, Pa., U.S.A.). Also suitable is Triton X-100 and surfactants having fluorinated alkyl chains such as "Flourad" products sold by Minnesota Mining and Manufacturing (St. Paul, Minn., U.S.A.) and "Zonyl" products sold by DuPont Company (Wilmington, Del., U.S.A.). In addition, many embodiments include polyethoxy adducts or modified (poly)ethoxylates such as Triton DF-12 and DF-16 sold by Union Carbide (Danbury, Conn., U.S.A.). Other surfactants include nonylphenoxypolyethanol (such as IGEPAL CO-660 made by GAF), polyoxyalkylene glycol (such as Macol 18 and 19 made by Mazer Chemicals), acetylenic diol-based surfactants (such as Surfynol 104A made by Air Products), and the like.

To provide a continuous and level film, the protectant composition should adequately wet the surface to be protected. However, many surfaces, in particular, car body finishes, are themselves highly hydrophobic or purposely treated (e.g.

waxed) to have a low surface free energy so that water will bead. To facilitate wetting and thereby prevent the masking composition from beading, the surface tension of the masking composition may be lowered by the addition of a surfactant, e.g. a fluorinated surfactant.

One advantage of the compositions utilized in the method of the present invention, is that thickeners and/or preservatives are not required. Because acrylic acid copolymers do not support the growth of microbes, fungi and the like, at pH below 7 no preservative is required. Moreover, since the acrylic acid or methacrylic acid copolymer, itself, is a thickening agent as well as the film forming component of the masking material no additional thickening agent is required.

Preferred embodiments of the compositions utilized in the method of this invention may also include components to adjust pH. Means of adjusting pH are well known to those of skill in the art. In particular, it is often desirable to adjust the composition to a pH of 6 to about 7. This may be accomplished by the addition of one of a number of water soluble bases well known to those of skill in the art. These include, but are not limited to sodium hydroxide, sodium bicarbonate and amine bases such as pyridine and ethylamine and ammonia.

The protectant composition is an aqueous-based composition and therefore includes a substantial amount of water before drying. A variety of the materials may also be included in the coatings to confer specific additional properties. Thus, for example, the coating compositions may additionally include antioxidants or corrosion inhibitors, ultra-violet inhibitors, rust inhibitors and the like. Preferred embodiments may include foam reduction or foam control agents such as FoamMaker™, Bubble Breaker™, and 1 and 2 octanol. Antistatic compounds (preferably water soluble antistatics such as Larostat 264A made by Mazer Chemicals) may be added to prevent dust from being drawn to the surface. The protectant composition may also include sequesterants (typically less than 1%).

The protectant compositions are made by conventional means which typically comprise mixing the components thereof at substantially atmospheric pressure, so as to form a homogeneous dispersion or emulsion. Heat may be applied to speed preparation of the protectant composition. After formation of the homogeneous dispersion, the pH may be adjusted as discussed above. For example, the pH may be adjusted to pH 7-9 by the addition of sodium hydroxide or other pH adjusting reagents.

The protectant compositions are conveniently formulated as aqueous (water-based) dispersions or emulsions. Preferably, the particle size of the emulsion or dispersion is small and therefore the compositions prepared with said emulsion or dispersion exhibit solution-like properties. The aqueous formulation generally lacks toxic solvents and is therefore relatively easy to handle and work with and is readily disposed of without adverse environmental impact. Thus, it is generally desirable to avoid the inclusion of any reagents (e.g. oil, organic solvents, etc.) that impose difficulties in handling and/or disposal. Preferred protectant compositions are therefore aqueous compositions substantially or completely silicone and oil-free and free of organic solvents.

The coating formed by the method of the present invention is a temporary acrylic co-polymer coating. It prevents airborne contaminants from damaging automotive paint finishes while transporting vehicles to distant locations, or storing vehicles in open spaces. The coating shields automobile paint finishes against acid rain, industrial fallout, rail dust, overspray, bird droppings, jet engine fallout, and many other damaging factors. Life span of the coating is approximately 3 months, up to six months depending on climatic conditions.

Removal of the coating is accomplished by simply spraying on an aqueous alkaline solution, e.g. ammoniated water, including a surfactant, and rinsing the coating off with a pressure washer. After initial drying time of 20 minutes, the protected finish may be maintained by washing in a normal manner with car wash soap and water anytime it is needed.

The coating material is applied by one of a variety of techniques known to those of skill in the art. Particularly preferred techniques include brushing and spraying of the protectant composition. In one preferred embodiment the automobile surface to be protected is blown dry of dust and debris. In some cases, additional water may be added for easier application, such as a 10% dilution. Thereafter, the protectant material is applied with a pressure pot sprayer, preferably first in a thin mist and, thereafter, in a flow coat or thicker substantially continuous film. For some applications, the mist coat will not be necessary. The protectant composition is sprayed primarily in the surface to be protected, although overspray will not pose significant problems since any overspray may be readily removed with, for example, a wet towel or sponge.

In preferred embodiments, the resulting protectant coating is applied in a wet coating in a thickness ranging from about 1 to about 10 mils, more preferably ranging from about 1 to about 4 mils, and most preferably ranging from about 1 to about 3 mils. This wet coating then dries to form a continuous dry coating ranging from about 0.5 to about 1 mil in thickness.

The protectant coating is typically permitted to dry at atmospheric temperatures and pressures. For a 1 to 2 mil wet thickness coating, such drying will take about 10 minutes at 70° F. and about 50% humidity.

Alternatively, the protectant composition may be force-dried. Force drying may be accomplished by means well known to those of skill in the art. These include, but are not limited to the application of heat (e.g. radiant heating, oven baking, or hot air blowers), the reduction of air humidity, air movement or any combination of these means. Under forced drying conditions at about 150° F. and about 50% humidity, the same coatings will dry in about 2 minutes.

One of skill in the art will readily appreciate that the steps of applying and drying the protectant composition, may be easily set up for mass production, as in an assembly line.

The following example is intended to illustrate the present invention and are not intended to limit the scope of the invention in any way.

EXAMPLE 40 parts, by weight, of an acrylic colloidal dispersion such as Carboset® 511, available from B.F. Goodrich are diluted with 57.5 parts water, 0.6 parts of a glycolether, 0.8 parts of a pH buffer, and 0.1 part of a preservative. Carboset® 511 is an acrylic colloidal dispersion, available from BF Goodrich and has total solids of 30 percent, by weight, in a water/ammonia solution. The acid number of said dispersion is about 75 and the pH is 6.8.

The coating is applied, by spraying, to an automotive body panel test surface to cover the test surface. The test surface represents a standard painted automobile body surface. The coatings is then either air dried or force-dried by heating.

The coated test panels were exposed to South Florida sun for 3 months. (Total radiation was 1580.90 $MJ/m^2$).

Panels were observed to exhibit moderate to pronounced water spotting at the end of the exposure period. The coating was found to be intact at the end of the period, i.e., the coating did not weather away.

The coating was then easily dissolved and rinsed away using an aqueous ammonia solution.

The underlying paint finish was rated 10 (excellent) for General Appearance, Color, Dirt, and Mildew. This means there were no perceivable effects from weathering.

The above description is illustrated and not restrictive. Many variations of the invention will be apparent to those of skill in the art upon review of this disclosure. Merely by way of example, while the invention is illustrated with regard to particular brands of materials used in the automobile finish protectant, the invention is not so limited. The scope of the invention should, therefore, be determined not with reference to the above description, but instead should be determined with reference to the appended claims along with their full scope of equivalents.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A composition for protecting a surface of an automobile body, covered by an automobile finish, the composition comprising:
    a film forming acrylic acid copolymer, said co-polymer containing acrylic being solubilized by alkali in an aqueous solution or emulsion, the aqueous solution or emulsion comprises about 40 pph of an acrylic colloidal dispersion, wherein said dispersion comprises about 30 percent, by weight, acrylic solids, about 57.5 pph water, about 0.6 pph of a glycolether, about 0.8 pph of a pH buffer, and about 0.1 pph of a preservative.

2. The composition of claim 1 wherein said aqueous solution or emulsion comprises a surfactant.

3. The composition of claim 1 wherein said aqueous solution or emulsion comprises 0.1 to 5 pph of zirconium crosslinking agent.

4. The composition of claim 3 wherein said zirconium crosslinking agent is ammonium zirconium carbonate.

* * * * *